US007980938B2

(12) United States Patent
Thomas

(10) Patent No.: US 7,980,938 B2
(45) Date of Patent: Jul. 19, 2011

(54) WAGERING GAME WITH VIDEO LOTTERY BONUS GAME

(75) Inventor: Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 1328 days.

(21) Appl. No.: 10/594,167

(22) PCT Filed: Mar. 18, 2005

(86) PCT No.: PCT/US2005/008979
§ 371 (c)(1),
(2), (4) Date: Sep. 26, 2006

(87) PCT Pub. No.: WO2005/099841
PCT Pub. Date: Oct. 27, 2005

(65) Prior Publication Data

US 2007/0207847 A1 Sep. 6, 2007

Related U.S. Application Data

(60) Provisional application No. 60/557,296, filed on Mar. 29, 2004.

(51) Int. Cl.
*G06F 17/00* (2006.01)

(52) U.S. Cl. .......................................................... 463/17

(58) Field of Classification Search ............... 463/16–25
See application file for complete search history.

(56) References Cited

U.S. PATENT DOCUMENTS 4,592,546 A 6/1986 Fascenda et al. ............. 273/1 E
4,624,459 A 11/1986 Kaufman .................. 273/143 R
4,837,728 A 6/1989 Barrie et al. .................. 364/412
4,861,041 A 8/1989 Jones et al. .................... 273/292
4,871,171 A 10/1989 Rivero .......................... 463/138
4,948,134 A 8/1990 Suttle et al. ..................... 273/85
5,116,055 A 5/1992 Tracy ........................ 273/138 A
5,249,800 A 10/1993 Hilgendorf et al. ....... 273/138 A
5,275,400 A 1/1994 Weingardt et al. .............. 463/12
5,280,909 A 1/1994 Tracy ........................ 273/138 A
5,344,144 A 9/1994 Canon ....................... 273/138 A
5,377,973 A 1/1995 Jones et al. ............... 273/85 CP (Continued)

FOREIGN PATENT DOCUMENTS

CA 2 334 546 8/2001

(Continued)

OTHER PUBLICATIONS

Article for "Easy Riches" by Sigma Game, Strictly Slots, 1 page (Aug. 2001).

(Continued)

*Primary Examiner* — Ronald Laneau
(74) *Attorney, Agent, or Firm* — Nixon Peabody LLP

(57) ABSTRACT

System and method are disclosed for operating a gaming terminal. The system and method of the invention involves using a real-life video of a lottery drawing to conduct a wagering game on the gaming terminal. The wagering game may be a basic game or it may be a bonus game that is initiated on the occurrence of a certain outcome in the basic game. The real-life video of the lottery drawing may be stored locally on the gaming terminal, or it may be stored remotely on a network and subsequently streamed to the gaming terminal. The use of such a real-life video increases the entertainment value of the gaming terminal.

29 Claims, 5 Drawing Sheets

U.S. PATENT DOCUMENTS

| | | | | |
|---|---|---|---|---|
| 5,380,007 | A * | 1/1995 | Travis et al. | 463/18 |
| 5,393,057 | A | 2/1995 | Marnell, II | 273/85 CP |
| 5,411,258 | A | 5/1995 | Wilson et al. | 273/86 |
| 5,417,430 | A | 5/1995 | Breeding | 273/292 |
| 5,524,888 | A | 6/1996 | Heidel | 463/22 |
| 5,544,892 | A | 8/1996 | Breeding | 273/292 |
| 5,564,700 | A | 10/1996 | Celona | 463/27 |
| 5,577,959 | A | 11/1996 | Takemoto | 463/25 |
| 5,580,063 | A | 12/1996 | Edwards | 273/378 |
| 5,580,309 | A | 12/1996 | Piechowiak et al. | 463/16 |
| 5,611,730 | A | 3/1997 | Weiss | 463/20 |
| 5,645,486 | A | 7/1997 | Nagao et al. | 463/27 |
| 5,647,592 | A | 7/1997 | Gerow | 463/139 |
| 5,655,961 | A | 8/1997 | Acres et al. | 463/27 |
| 5,766,076 | A | 6/1998 | Pease et al. | 463/27 |
| RE35,864 | E | 7/1998 | Weingardt | 463/28 |
| 5,779,549 | A | 7/1998 | Walker et al. | 463/42 |
| 5,816,918 | A | 10/1998 | Kelly et al. | 463/16 |
| 5,820,459 | A | 10/1998 | Acres et al. | 463/25 |
| 5,823,874 | A | 10/1998 | Adams | 463/17 |
| 5,830,068 | A | 11/1998 | Brenner et al. | 463/42 |
| 5,839,956 | A | 11/1998 | Takemoto | 463/25 |
| 5,848,932 | A | 12/1998 | Adams | 463/20 |
| 5,851,147 | A | 12/1998 | Stupak | 463/13 |
| 5,855,515 | A | 1/1999 | Pease et al. | 463/27 |
| 5,876,284 | A | 3/1999 | Acres et al. | 463/25 |
| 5,885,158 | A | 3/1999 | Torango et al. | 463/27 |
| 5,941,773 | A | 8/1999 | Harlick | 463/26 |
| 5,944,606 | A | 8/1999 | Gerow | 463/27 |
| 5,951,011 | A | 9/1999 | Potter et al. | 273/292 |
| 6,003,013 | A | 12/1999 | Boushy et al. | 705/10 |
| 6,007,427 | A | 12/1999 | Wiener et al. | 463/17 |
| 6,012,982 | A | 1/2000 | Piechowiak et al. | 463/16 |
| 6,032,955 | A | 3/2000 | Luciano et al. | 273/138.1 |
| 6,047,963 | A | 4/2000 | Pierce et al. | 273/121 B |
| 6,089,977 | A | 7/2000 | Bennett | 463/20 |
| 6,089,980 | A | 7/2000 | Gauselmann | 463/27 |
| 6,102,474 | A | 8/2000 | Daley | 296/836 |
| 6,102,799 | A | 8/2000 | Stupak | 463/27 |
| 6,110,043 | A | 8/2000 | Olsen | 463/27 |
| 6,139,013 | A | 10/2000 | Pierce et al. | 273/121 B |
| 6,142,872 | A | 11/2000 | Walker et al. | 463/16 |
| 6,146,273 | A | 11/2000 | Olsen | 463/27 |
| 6,155,925 | A | 12/2000 | Giobbi et al. | 463/20 |
| 6,158,741 | A | 12/2000 | Koelling | 273/292 |
| 6,159,097 | A | 12/2000 | Gura | 463/20 |
| 6,168,523 | B1 | 1/2001 | Piechowiak et al. | 463/26 |
| 6,203,010 | B1 | 3/2001 | Jorasch et al. | 273/138.1 |
| 6,206,374 | B1 | 3/2001 | Jones | 273/292 |
| 6,206,782 | B1 | 3/2001 | Walker et al. | 463/25 |
| 6,210,275 | B1 | 4/2001 | Olsen | 463/16 |
| 6,210,277 | B1 | 4/2001 | Stefan | 463/27 |
| 6,217,448 | B1 | 4/2001 | Olsen | 463/25 |
| 6,220,593 | B1 | 4/2001 | Pierce et al. | 273/138.1 |
| 6,224,482 | B1 | 5/2001 | Bennett | 463/20 |
| 6,224,484 | B1 | 5/2001 | Okuda et al. | 463/27 |
| 6,231,445 | B1 | 5/2001 | Acres | 463/42 |
| 6,241,608 | B1 | 6/2001 | Torango | 463/27 |
| 6,254,483 | B1 | 7/2001 | Acres | 463/26 |
| 6,312,332 | B1 | 11/2001 | Walker et al. | 463/23 |
| 6,315,660 | B1 | 11/2001 | DeMar et al. | 463/16 |
| 6,319,125 | B1 | 11/2001 | Acres | 463/25 |
| 6,319,127 | B1 | 11/2001 | Walker et al. | 463/26 |
| 6,336,859 | B2 | 1/2002 | Jones et al. | 463/13 |
| 6,336,862 | B1 | 1/2002 | Byrne | 463/27 |
| 6,345,824 | B1 | 2/2002 | Selitzky | 273/292 |
| 6,358,149 | B1 | 3/2002 | Schneider et al. | 463/27 |
| 6,358,150 | B1 | 3/2002 | Mir et al. | 463/28 |
| 6,361,441 | B1 | 3/2002 | Walker et al. | 463/42 |
| 6,364,768 | B1 | 4/2002 | Acres et al. | 463/25 |
| 6,375,567 | B1 | 4/2002 | Acres | 463/25 |
| 6,375,568 | B1 | 4/2002 | Roffman et al. | 463/26 |
| 6,416,409 | B1 | 7/2002 | Jordan | 463/27 |
| 6,431,983 | B2 | 8/2002 | Acres | 463/25 |
| 6,435,968 | B1 | 8/2002 | Torango | 463/27 |
| 6,439,995 | B1 | 8/2002 | Hughs-Baird et al. | 463/20 |
| 6,482,089 | B2 | 11/2002 | DeMar et al. | 463/20 |
| 6,506,117 | B2 | 1/2003 | DeMar et al. | 463/20 |
| 6,508,707 | B2 | 1/2003 | DeMar et al. | 463/16 |
| 6,517,433 | B2 | 2/2003 | Loose et al. | 463/20 |
| 6,520,855 | B2 | 2/2003 | DeMar et al. | 463/20 |
| 6,577,733 | B1 | 6/2003 | Charrin | 380/251 |
| 6,589,115 | B2 | 7/2003 | Walker et al. | 463/25 |
| 6,592,458 | B1 | 7/2003 | Ho | 463/17 |
| 6,592,460 | B2 | 7/2003 | Torango | 463/27 |
| 6,599,186 | B1 | 7/2003 | Walker et al. | 463/17 |
| 6,599,188 | B2 | 7/2003 | Hirsch et al. | 463/19 |
| 6,599,193 | B2 | 7/2003 | Baerlocher et al. | 463/27 |
| 6,601,771 | B2 | 8/2003 | Charrin | 235/492 |
| 6,648,762 | B2 | 11/2003 | Walker et al. | 463/25 |
| 6,656,052 | B2 | 12/2003 | Abramopoulos et al. | 463/47 |
| 6,676,513 | B2 | 1/2004 | Gauselmann | 463/20 |
| 6,712,695 | B2 | 3/2004 | Mothwurf et al. | 463/25 |
| 6,733,390 | B2 | 5/2004 | Walker et al. | 463/23 |
| 6,776,715 | B2 | 8/2004 | Price | 463/27 |
| 6,887,154 | B1 | 5/2005 | Luciano, Jr. et al. | 463/26 |
| 7,004,466 | B2 | 2/2006 | Gauselmann | 463/138 |
| 7,036,012 | B2 | 4/2006 | Charrin | 713/169 |
| 7,056,215 | B1 | 6/2006 | Olive | 463/27 |
| 2001/0036853 | A1 | 11/2001 | Thomas | 463/17 |
| 2002/0138594 | A1 | 9/2002 | Rowe | 709/219 |
| 2002/0151345 | A1 | 10/2002 | Byrne | 463/18 |
| 2002/0155874 | A1 | 10/2002 | Byrne | 463/16 |
| 2003/0014370 | A1 | 1/2003 | Charrin | 705/65 |
| 2003/0027618 | A1 | 2/2003 | Byrne | 463/16 |
| 2003/0027625 | A1 | 2/2003 | Rowe | 463/20 |
| 2003/0036430 | A1 | 2/2003 | Cannon | 463/42 |
| 2003/0045337 | A1 | 3/2003 | Byrne | 463/16 |
| 2003/0050106 | A1 | 3/2003 | Lyfoung | 463/13 |
| 2003/0054870 | A1 | 3/2003 | Sato et al. | 463/16 |
| 2003/0060266 | A1 | 3/2003 | Baerlocher | 463/20 |
| 2003/0064776 | A1 | 4/2003 | Byrne | 463/16 |
| 2003/0109306 | A1 | 6/2003 | Karmarkar | 463/40 |
| 2003/0148808 | A1 | 8/2003 | Price | 463/27 |
| 2003/0181231 | A1 | 9/2003 | Vancura et al. | 463/9 |
| 2003/0186733 | A1 | 10/2003 | Wolf et al. | 463/16 |
| 2003/0211884 | A1 | 11/2003 | Gauselmann | 463/20 |
| 2003/0216166 | A1 | 11/2003 | Baerlocher et al. | 463/20 |
| 2003/0222402 | A1 | 12/2003 | Olive | 273/292 |
| 2003/0228899 | A1 | 12/2003 | Evans | 463/25 |
| 2003/0236116 | A1 | 12/2003 | Marks et al. | 463/16 |
| 2004/0009808 | A1 | 1/2004 | Gauselmann | 463/25 |
| 2004/0009811 | A1 | 1/2004 | Torango | 463/25 |
| 2004/0023716 | A1 | 2/2004 | Gauselmann | 463/23 |
| 2004/0038741 | A1 | 2/2004 | Gauselmann | 463/42 |
| 2004/0048644 | A1 | 3/2004 | Gerrard et al. | 463/16 |
| 2004/0092304 | A1 | 5/2004 | George | 463/29 |
| 2005/0003880 | A1 | 1/2005 | Engleman | 463/16 |
| 2005/0055113 | A1 | 3/2005 | Gauselmann | 700/91 |
| 2005/0059467 | A1 | 3/2005 | Saffari et al. | 463/19 |
| 2005/0059472 | A1 | 3/2005 | Joshi et al. | 463/20 |
| 2005/0064930 | A1 | 3/2005 | Jubinville et al. | 463/17 |
| 2005/0096130 | A1 | 5/2005 | Mullins | 463/27 |
| 2005/0137010 | A1 | 6/2005 | Enzminger et al. | 463/25 |
| 2005/0192088 | A1 | 9/2005 | Hartman et al. | 463/27 |
| 2005/0197181 | A1 * | 9/2005 | Jaffe | 463/20 |
| 2005/0215313 | A1 | 9/2005 | O'Halloran | 463/26 |
| 2005/0261047 | A1 * | 11/2005 | Fiden et al. | 463/16 |
| 2006/0003829 | A1 | 1/2006 | Thomas | 463/20 |
| 2006/0019737 | A1 | 1/2006 | Yang | 463/19 |
| 2006/0025195 | A1 | 2/2006 | Pennington et al. | 463/16 |
| 2006/0025210 | A1 | 2/2006 | Johnson | 463/25 |
| 2006/0030403 | A1 | 2/2006 | Lafky et al. | 463/27 |
| 2006/0052159 | A1 | 3/2006 | Cahill et al. | 463/27 |
| 2006/0073887 | A1 | 4/2006 | Rodgers et al. | 463/20 |
| 2006/0073889 | A1 | 4/2006 | Edidin et al. | 463/27 |
| 2006/0116201 | A1 | 6/2006 | Gausselmann | 463/26 |
| 2006/0142077 | A1 * | 6/2006 | Miles et al. | 463/20 |
| 2006/0142079 | A1 | 6/2006 | Ikehara et al. | 463/27 |
| 2006/0142086 | A1 | 6/2006 | Blackburn et al. | 463/42 |
| 2006/0154718 | A1 | 7/2006 | Willyard et al. | 463/25 |
| 2006/0178203 | A1 * | 8/2006 | Hughes et al. | 463/20 |
| 2006/0183535 | A1 | 8/2006 | Marks et al. | 463/20 |
| 2006/0183537 | A1 | 8/2006 | Dickerson | 463/27 |
| 2006/0183538 | A1 | 8/2006 | Michaelson et al. | 463/27 |
| 2006/0281527 | A1 | 12/2006 | Dunaevsky et al. | 463/20 |
| 2006/0287077 | A1 | 12/2006 | Grav et al. | 463/27 |

| | | | | |
|---|---|---|---|---|
| 2007/0026941 | A1 | 2/2007 | Block et al. | 463/29 |
| 2007/0054733 | A1 | 3/2007 | Baerlocher | 463/27 |
| 2007/0060244 | A1 | 3/2007 | Yaldoo et al. | 463/16 |
| 2007/0060271 | A1 | 3/2007 | Cregan et al. | 463/16 |
| 2007/0060314 | A1 | 3/2007 | Baerlocher et al. | 463/25 |
| 2007/0060319 | A1 | 3/2007 | Block et al. | 463/27 |
| 2007/0060365 | A1 | 3/2007 | Tien et al. | 463/42 |
| 2009/0093300 | A1 * | 4/2009 | Lutnick et al. | 463/26 |
| 2009/0197684 | A1 * | 8/2009 | Arezina et al. | 463/42 |

FOREIGN PATENT DOCUMENTS

| | | | |
|---|---|---|---|
| DE | 195 15 983 | A1 | 11/1996 |
| DE | 196 24 321 | A1 | 1/1998 |
| EP | 0 521 599 | A1 | 1/1993 |
| GB | 2 153 572 | A | 8/1985 |
| GB | 2 181 589 | A | 4/1987 |
| GB | 2 242 300 | A | 9/1991 |
| GB | 2 313 792 | A | 10/1997 |
| GB | 2 333 880 | A | 8/1999 |
| WO | WO 99/03078 | A1 | 1/1999 |
| WO | WO 99/19037 | A1 | 4/1999 |
| WO | WO 01/33478 | A1 | 5/2001 |
| WO | WO 03/026754 | A1 | 4/2003 |
| WO | WO 03/083789 | A1 | 10/2003 |

OTHER PUBLICATIONS

Article for “Millioniser” by Glenn Haussman, Strictly Slots, pp. 50-53 (Mar. 2004).

Product Sheet for “Big Games Safari,” IGT, 24 pages (2000).

“New ’97 Games,” International Gaming & Wagering Business, 24 pages (Mar. 1997).

International Search Report—PCT/US05/08979 dated Jun. 17, 2005 (2 pages).

* cited by examiner

WAGERING GAME WITH VIDEO LOTTERY BONUS GAME

CROSS-REFERENCE TO RELATED APPLICATIONS

This application is a U.S. national phase of International Application No. PCT/US2005/008979, filed Mar. 18, 2005, which claims the benefit of priority from U.S. Provisional Patent Application No. 60/557,296, filed Mar. 29, 2004, both of which are incorporated by reference in their entirety.

FIELD OF THE INVENTION

The present invention relates generally to gaming terminals and, more particularly, to a gaming terminal having a bonus game where awards are indicated by a real-life video of a lottery drawing.

BACKGROUND OF THE INVENTION

Gaming terminals, such as slot machines, video poker machines, and the like, have been a cornerstone of the gaming industry for several years. Generally, the popularity of such terminals among players depends on the perceived likelihood of winning money at the terminal and the intrinsic entertainment value of the terminal relative to other available gaming options. Where the available gaming options include a number of competing terminals and the expectation of winning each terminal is roughly the same (or believed to be the same), players are most likely to be attracted to the more entertaining and exciting of the terminals.

Consequently, gaming terminal operators strive to employ the most entertaining and exciting terminals available because such terminals attract frequent play and, hence, increase profitability for the operators. Thus, in the highly competitive gaming terminal industry, there is a continuing need to develop new types of games, or improvements to existing games, that will enhance the entertainment value and excitement associated with the games.

One concept that has been successfully employed to enhance the entertainment value is that of a progressive jackpot, or "progressive." In the gaming industry, a progressive involves collecting data on the wagers placed, or "coin-in" data, from participating gaming devices (e.g., slot machines), contributing a percentage of that coin-in data to a jackpot amount, and awarding the jackpot amount to a player upon the occurrence of a certain jackpot-won event. A jackpot-won event typically occurs when a "progressive winning position" is achieved at a participating gaming device. If the gaming device is a slot machine, for example, a progressive winning position may correspond to alignment of progressive jackpot reel symbols along a certain payline. The initial progressive jackpot is a usually preset minimum amount, but progressively increases as players continue to play the gaming terminal without winning the jackpot. Further, when several gaming terminals are linked together such that players at several gaming terminals compete for the same jackpot, the jackpot progressively increases at a much faster rate, which leads to further player excitement. In existing progressive jackpots, the progressives are often high-pay, low-frequency progressives, which may result in some players becoming disheartened when they do not win.

Another concept that has been successfully employed is that of a "secondary" or "bonus" game which may be played in conjunction with a "basic" game. The bonus game may include any type of game, either similar to or completely different from the basic game, and is initiated by the occurrence of certain pre-selected events or outcomes of the basic game. For example, the progressive described above may be played as a bonus game. Such a bonus game has been found to produce a significantly higher level of player excitement than the basic game because it provides a greater expectation of winning than the basic game.

In existing gaming terminals, the winning outcome for both the bonus game and the basic game is usually announced by bright lights and/or flashing signage. Some of the more advanced gaming terminals may also use animation displayed via neon lights or on a simple display screen. It has been observed, however, that such artificial imagery has limited entertainment value beyond the first few encounters. A real-life video of events and people, on the other hand, provides greater player appeal and longer enjoyment. This is due, in part, to people's tendency to relate better on an emotional and psychological level to seeing real-life events and people than to flashing lights and animation.

Accordingly, what is needed is a gaming terminal that is capable of providing increased excitement and entertainment value over existing gaming terminals. More specifically, what is needed is a gaming terminal that uses real-life videos of events and people as part of the gaming experience in order to capture and retain player interest.

SUMMARY OF THE INVENTION

The present invention is directed to a system and method of operating a gaming terminal. The system and method of the invention involves using a real-life video of a lottery drawing to conduct a wagering game on the gaming terminal. The wagering game may be a basic game or it may be a bonus game that is initiated on the occurrence of a certain outcome in the basic game. The real-life video of the lottery drawing may be stored locally on the gaming terminal, or it may be stored remotely on a network and subsequently streamed to the gaming terminal. The use of such a real-life video increases the entertainment value of the gaming terminal.

In general, in one aspect, the invention is directed to a method of conducting a wagering game. The method comprises allocating lottery numbers to a player of the wagering game and storing a plurality of real-life video clips showing different outcomes of a lottery drawing with number-bearing lottery balls. The method further comprises randomly selecting an outcome for the wagering game and playing back one of the plurality of real-life video clips corresponding to the randomly selected outcome.

In general, in another aspect, the invention is directed to a method of conducting a wagering game on a gaming terminal. The method comprises the steps of allowing a player to manually select a plurality of lottery numbers for the wagering game and displaying the plurality of lottery numbers on the gaming terminal. The method further comprises randomly selecting an outcome for the wagering game and playing back a real-life video clip on the gaming terminal showing a lottery drawing corresponding to the randomly selected outcome.

In general, in yet another aspect, the invention is directed to a gaming terminal for playing a basic wagering game and a bonus game. The gaming terminal comprises at least one display for displaying a randomly selected outcome for the basic wagering game, the randomly selected outcome being selected from a plurality of outcomes in response to receiving a wager input from a player, the plurality of outcomes including a start-bonus outcome. In response to the start-bonus outcome being the randomly selected outcome, the at least one display displays a lottery ticket with lottery numbers thereon and a real-life video of a lottery drawing in which number-bearing lottery balls are randomly selected and displayed. The player achieves a bonus award when there is a match between at least some of the lottery numbers and the selected number-bearing lottery balls.

In general, in still another aspect, the invention is directed to a method of conducting a basic wagering game and a bonus game on a gaming terminal. The method comprises the steps of accepting a wager input for the basic wagering game and displaying a randomly selected outcome for the basic wagering game in response to the wager input. The randomly selected outcome is selected from a plurality of outcomes that includes at least one start-bonus outcome. If the randomly selected outcome is the start-bonus outcome, the method further comprises playing back a real-life video of a lottery drawing in which number-bearing lottery balls are randomly selected and displayed. A determination is made as to whether the lottery numbers associated with the player match the selected number-bearing lottery balls, and a bonus is awarded in response to a match between at least some of the lottery numbers and the selected number-bearing lottery balls.

In general, in yet another aspect, the invention is directed to a gaming terminal. The gaming terminal comprises a first display configured to display a randomly selected outcome from a basic wagering game, the randomly selected outcome being selected from a plurality of outcomes in response to receiving a wager input, the plurality of outcomes including at least one start-bonus outcome. The gaming terminal further comprises a second display, wherein if the at least one start-bonus outcome is the randomly selected outcome, the second display is configured to display a lottery ticket with lottery numbers thereon and play back a real-life video of a lottery drawing in which number-bearing lottery balls are randomly selected.

In general, in still another aspect, the invention is directed to a method of conducting a wagering game on a gaming terminal. The method comprises storing, in a database, a set of player-preferred selections from an array of player-selectable options, where the array is used for determining a randomly selected outcome to the wagering game. The method further comprises retrieving the set of player-preferred selections from the database, applying the set of player-preferred selections to the wagering game, and determining an outcome of the wagering game based on the applying step.

The above summary of the present invention is not intended to represent each embodiment, or every aspect, of the present invention. The detailed description and figures will describe many of the embodiments and aspects of the present invention.

BRIEF DESCRIPTION OF THE DRAWINGS

The foregoing and other advantages of the invention will become apparent upon reading the following detailed description and upon reference to the drawings, wherein.

Figure 1:
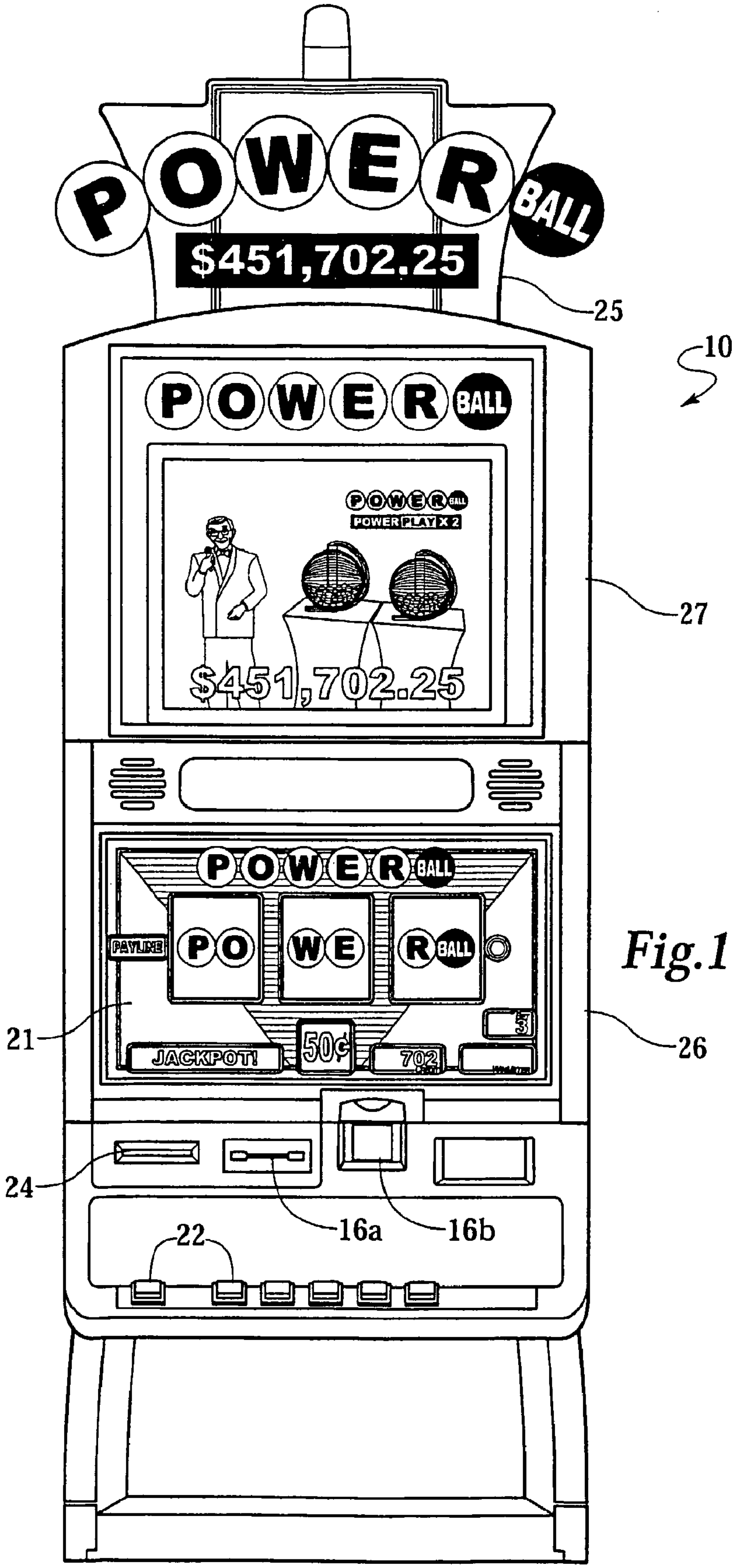
FIG. 1 illustrates a perspective view of a gaming terminal according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

As alluded to above, embodiments of the invention provide a system and method of conducting a wagering game using real-life video clips. The system and method of the invention plays back real-life video clips of events and people in a gaming terminal instead of, or in addition to, flashing lights and animation. As used herein, the term "real-life" video refers to video clips that are not animated or computer-generated. The real-life video clips may be used either as part of a basic game or a bonus game, although the invention is described primarily with respect to a bonus game for economy of the description.

One game that everyone can relate to is the lottery. People from all ages and walks of life dream of winning the lottery some day and never having to work again. They ponder the numerous things that they would do if they won the lottery, from buying a new house, to early retirement, to taking a long vacation. Different people have different approaches to picking lottery numbers. Some people use only certain "lucky" numbers (e.g., dates of birth, age, phone numbers, etc.) that they believe will increase their chances, or they purchase their lottery tickets only from certain places or only on certain days. Other people see it as a predestined event that will happen, if at all, in spite of anything they might do. Regardless, few things can invoke the same high level of anticipation and excitement as the lottery.

The present invention tries to recreate some of this anticipation and excitement by providing a video lottery game in a gaming terminal. The video lottery game may be implemented as either a basic game or a bonus game in the gaming terminal. To enhance a player's level of anticipation and excitement, the invention uses a real-life video of a lottery drawing to conduct the lottery game. Those having ordinary skill in the art, however, will appreciate that the real-life video is not limited to just lottery games, but may apply equally well to other types of games, including roulette, dice, and the like.

FIG. 1 shows a perspective view of an exemplary gaming terminal 10 according to embodiments of the invention. The gaming terminal 10 may be operated as a stand alone terminal, or it may be connected to a network of gaming terminals. Further, the gaming terminal 10 may be any type of gaming terminal and may have varying structures and methods of operation. For example, the gaming terminal 10 may be a mechanical gaming terminal configured to play mechanical slots, or it may be an electromechanical or electrical gaming terminal configured to play a video casino game, such as blackjack, slots, keno, poker, etc. In the example shown, the gaming terminal 10 is a video slot machine.

As shown, the gaming terminal 10 has a number of typical gaming terminal components, including input devices, such as a wager acceptors 16*a* and 16*b*, push-buttons 22, and a player-identification card reader 24. For outputs, the gaming terminal 10 includes a progressive game display 25 for displaying the value of a progressive game, and a main display 26 for displaying information about the basic wagering game. While these typical components found in the gaming terminal 10 are described below, it should be understood that numerous other elements may exist and may be used in any number of combinations to create various forms of a gaming terminal.

The wager acceptors 16*a* and 16*b* may be provided in many forms, including a card wager acceptor 16*a* and a cash wager acceptor 16*b*. The cash wager acceptor 16*b* may include a coin slot acceptor or a note acceptor to input value to the gaming terminal 10. The card wager acceptor 16*a* may include a card-reading device for receiving a stored value card and reading a recorded monetary value associated with the card. The card wager acceptor 16*a* may also receive a card that authorizes a transfer of money from a player's credit or banking account to the gaming terminal 10.

The push buttons 22 lets players select various options with respect to the games played on the gaming terminal 10. These push buttons 22 may be mechanical push buttons or they may be soft buttons on a touch screen 21 located over the main display 26.

The outcome of the basic wagering game is displayed on the main display 26. The main display 26 may be a conventional 3-slot mechanical reel, or it may take the form of a cathode ray tube (CRT), a liquid crystal display (LCD), a plasma display, or any other type of secondary display suitable for a displaying a 3-slot mechanical reel. As shown, the main display 26 displays the outcome of the basic game, which is indicated by a single payline across the three video reels of the gaming terminal 10. The present invention also applies to machines having multiple paylines on the main display 26 as well.

In the present example, the basic game includes a progressive game, preferably linked with other gaming terminals, wherein the entire progressive jackpot may be won upon the occurrence of a certain outcome. In some embodiments, the player is only eligible for the progressive jackpot if he plays all of the paylines and/or wagers the maximum amount on each of the paylines played. In other embodiments, the player is automatically eligible to play for the progressive and is not required to make a minimum wager or to play a minimum number of lines. Alternatively, there may be a "side-wager" option that allows the player to be eligible for the progressive jackpots. The "side-wager" option is described in U.S. patent application Ser. No. 10/659,878, filed on Sep. 11, 2003, entitled "Gaming Terminal With Multi-Level Progressive Jackpot," which is commonly owned and herein incorporated by reference in its entirety.

The player-identification card reader 24 is designed to read an identification card and extract information therefrom regarding the player's identity. The identification may then be used by casinos for rewarding certain players with complimentary services or special offers. For example, a player may be enrolled in the gaming establishment's players' club and may be awarded certain complimentary services as that player collects points in his or her player-tracking account. When the player inserts his or her card into the player-identification card reader 24, the casino's computers can register that player's wagering at the gaming terminal 10.

The gaming terminal 10 further includes a secondary display 27 for showing real-life videos on the gaming terminal 10, as will be discussed in more detail below. The secondary display 27 may be used to conduct a bonus game, as mentioned above, that provides players with a secondary or "bonus" game where there is an increased likelihood of a positive outcome in the game. As shown in FIG. 4, the bonus games are triggered by a "Bonus" symbol appearing on the payline during the basic game. Note that the secondary display 27 may also show video clips for the basic game where it is appropriate to use video clips for the basic game.

Figure 2:
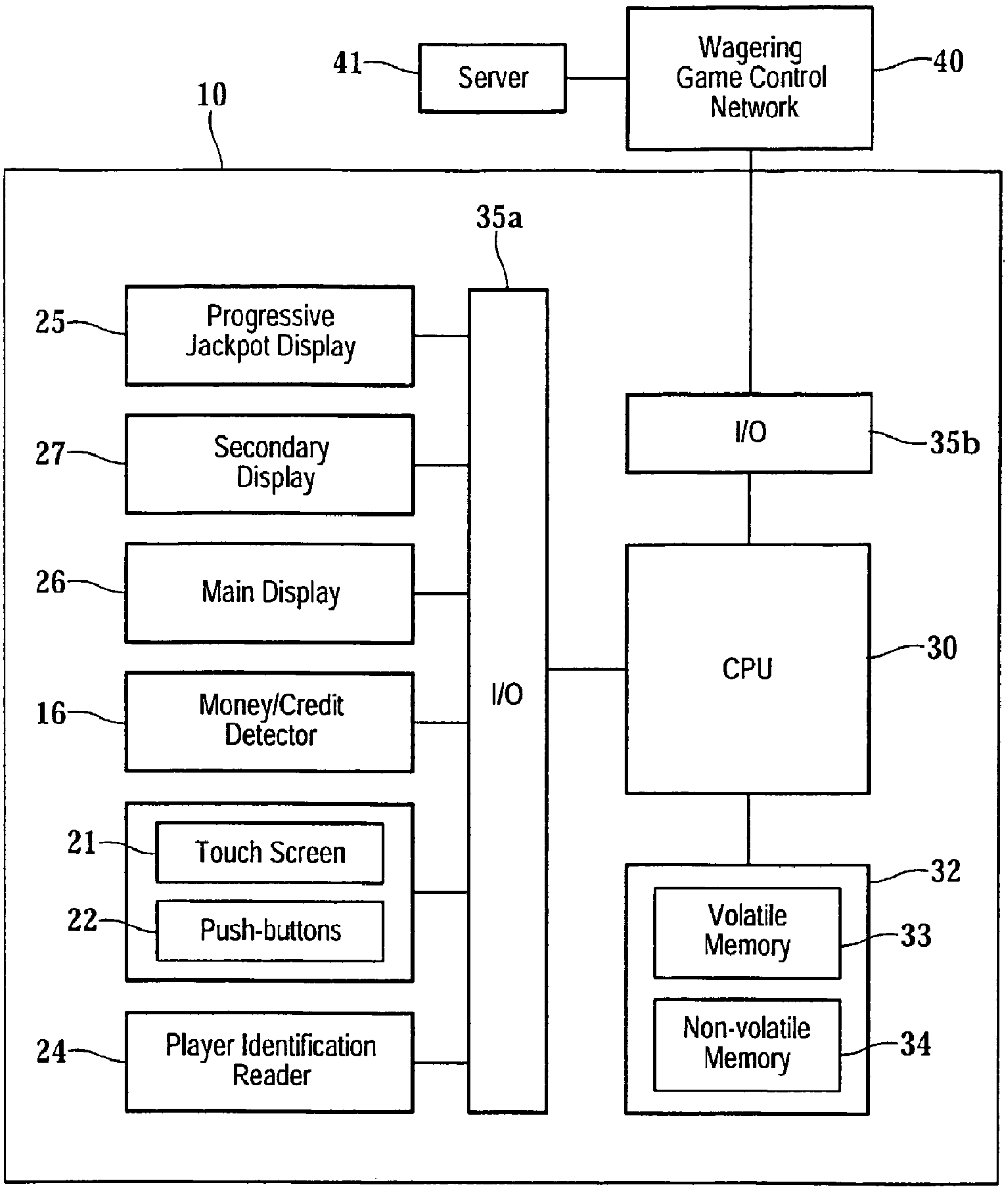
FIG. 2 illustrates a block diagram of the gaming terminal of FIG. 1.

As shown in FIG. 2, the various components of the gaming terminal 10 are controlled by a central processing unit (CPU) 30, such as a microprocessor or microcontroller. The CPU 30 executes one or more programs that randomly selects the outcomes for the gaming terminal 10 and controls the overall operation of the gaming terminal 10. The gaming terminal 10 also includes a storage unit 32 for storing the programs and real-life videos used by the CPU 30. The storage unit 32 may include a volatile memory 33 (e.g., a random-access memory (RAM)) and a non-volatile memory 34 (e.g., hard drive, optical drive, an EEPROM). It should be appreciated that the CPU 30 may include one or more microprocessors. Similarly, the storage unit 32 may include multiple volatile memories and non-volatile memories.

Communication between the peripheral components of the gaming terminal 10 and the CPU 30 occur through input/output (I/O) circuits 35*a*. As such, the CPU 30 also controls and receives inputs from the peripheral components of the gaming terminal 10. Further, the CPU 30 communicates with external systems via the I/O circuits 35*b*. Although the I/O circuits 35 may be shown as a single block, it should be appreciated that the I/O circuits 35 may include a number of different types of I/O circuits.

The gaming terminal 10 is frequently operated as part of a wagering game control network 40 that includes several gaming terminals. An example of such a wagering game control network 40 is described in U.S. Patent Application No. 60/502,762, filed on Sep. 12, 2003, and entitled "Restricted Access Progressive Game For A Gaming Terminal," which is commonly owned and incorporated herein by reference in its entirety. The gaming terminal 10 often has multiple ports, each port dedicated to providing data to a specific host computer system that performs a specific function (e.g., accounting, player-tracking, or a progressive game control system, etc). These ports may take the form of one or more custom interface boards mounted in the gaming terminal 10. The ports may also take the form of, for example, network interface cards designed to establish an Ethernet connection from the gaming terminal 10 to the wagering game control network 40.

In some embodiments, the wagering game control network 40 may include a server 41 that controls one or more functions of the gaming terminal 10. The server 41 may be any computer capable of executing programs for controlling slot machines and other types of gaming terminals. In such embodiments, the gaming terminal 10 may be a simple input/output terminal with regard to the functions controlled by the server 41. For example, the random selection of outcomes for the basic game and the bonus game may be functions performed by the server 41 and subsequently provided to the gaming terminal 10. Similarly, any real-life videos (described later herein) used with the basic game and/or the bonus game may be stored on the server 41 and subsequently streamed as data packets to the gaming terminal 10 as needed. Functions that are not provided by the server 41, such as control of the local lights, sounds, and displays of the gaming terminal 10, are handled by the local CPU 30.

Figure 3:
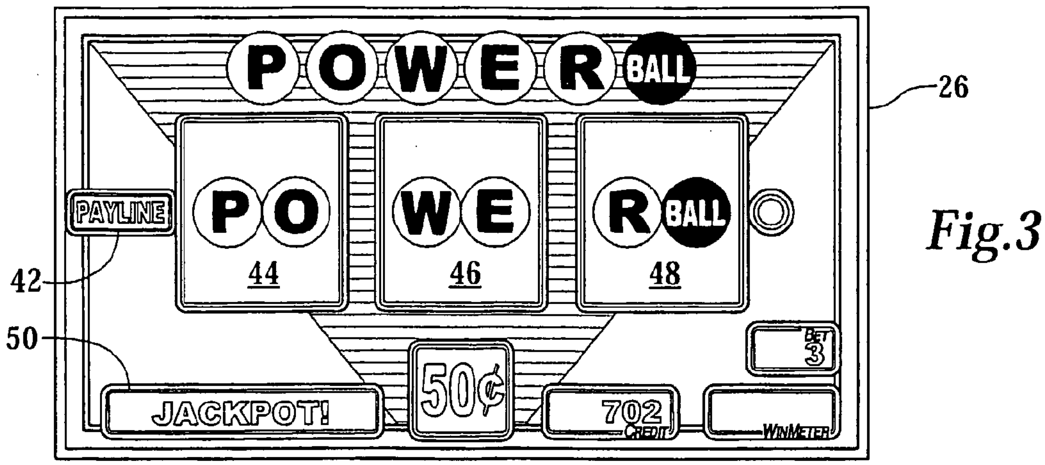
FIG. 3 illustrates a main display of the gaming terminal of FIG. 1.

FIG. 3 shows the main display 26 of the gaming terminal in more detail. As can be seen, the main display 26 includes a payline indicator 42, reels 44, 46, and 48, and an outcome indicator 50. The reels 44-48 may be either traditional mechanical reels or they may be computer-generated images of reels, with each reel composed of a plurality of symbols.

The payline indicator 42 indicates the randomly selected outcome, which is the combination of symbols on the reels 44-48. Generally, the symbols that line up with the payline indicator 42 are the only ones that are counted and, thus, it is necessary for a symbol to be exactly centered on the payline indicator 42. Thereafter, the outcome indicator 50 indicates whether the outcome has resulted in a payout, a progressive jackpot, a bonus game, or whether it resulted in nothing.

In the present example, the wagering game follows the theme of a Powerball® lottery game where a person picks five non-repeating lottery numbers, then specifies a sixth number, which is the power ball number. A drawing is then held where five balls are randomly selected from a container of number-bearing balls and a sixth ball is randomly selected from a separate container of number-bearing balls. If all the numbers on the balls match the person's numbers, including the power ball, then the person wins the jackpot. Lesser prizes are available where not all the numbers match.

As used in the illustrated embodiment, there are no lottery numbers or drawings in the basic game. Instead, the connection to the Powerball® lottery game lies in a winning payline that spells out the word "Powerball." When such an outcome occurs, the player wins the entire progressive jackpot as shown in progressive display 25.

Figure 4A:
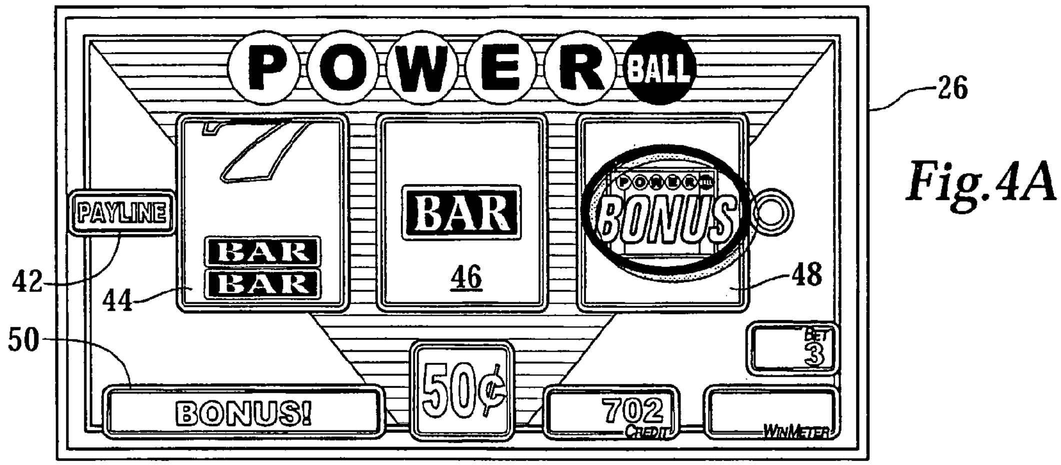
FIG. 4A illustrates a bonus game being triggered on the main display.

Should the player not hit the progressive jackpot in the basic game, he may nevertheless win the progressive jackpot if he is eligible to play a bonus game. Eligibility depends on whether the non-winning outcome of the basic game is one of several predetermined start-bonus game outcomes. FIG. 4A shows an example of a start-bonus game outcome where a "Bonus" symbol is located on one of the paylines in the basic game, triggering the bonus game. As can be seen, one reel 48 has stopped on the "Bonus" symbol (indicated by the payline indicator 42), which means the player is eligible to play the bonus game. Other start-bonus game outcomes may include, for example, two or more of any symbol, certain wildcard symbols, and the like.

Figure 4B:
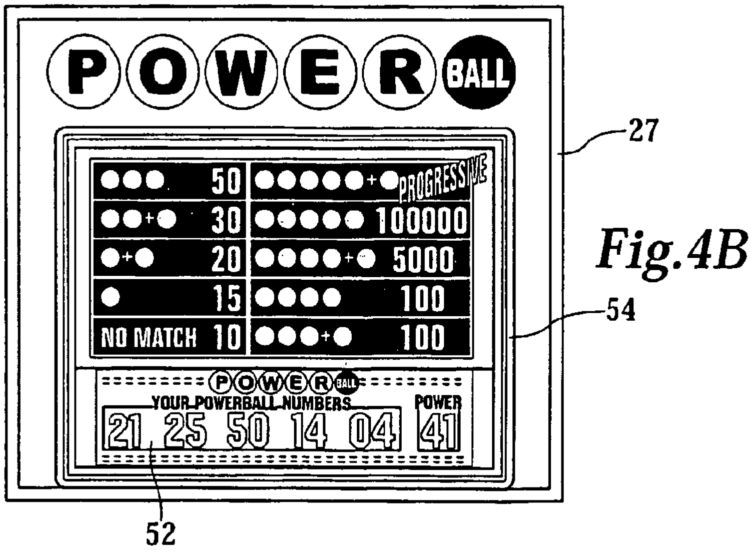
FIG. 4B illustrates a secondary display initiating the bonus game.

The bonus game in this example is a Powerball® lottery game, although other types of games may certainly be used (e.g., roulette, dice, etc.). Upon occurrence of a start-bonus game outcome, the gaming terminal 10 initiates a Powerball® lottery drawing on the secondary display 27, as shown in FIG. 4B. First, the player receives a lottery ticket (shown generally at 52) with five lottery numbers and one power ball number. It is possible, of course, for the lottery ticket 52 to have fewer (or more) than five lottery numbers, or no power ball numbers, or some other suitable combination. The player's lottery numbers are then displayed on the secondary display 27 along with a pay table 54. The pay table 54 lists the various amounts (e.g., in game credits, or actual dollars) that the player may win based on the number of matched lottery numbers. Thus, for example, three matched lottery numbers wins 50 game credits, three matched lottery numbers and the power ball number wins 100 game credits, and so on. If all the lottery numbers plus the power ball number match, then the player wins the grand prize, which is the progressive jackpot shown on the progressive display 25. In this way, players have a second chance of winning the progressive jackpot (the first chance being an outcome in the basic game as shown in FIG. 3) if they are able to match all five numbers plus the power ball number. It should be understood, however, that the basic game can lack an outcome that automatically awards the progressive jackpot on the progressive jackpot display 25 such that the progressive jackpot is only achieved through the video lottery drawing described in more detail below.

The lottery numbers and power ball number on the player's ticket may be automatically selected at random by the gaming terminal 10 or they may be provided by the server 41. Or, the player himself many select the numbers using the push buttons 22, touch screen 21 (FIGS. 1 and 2), or other suitable input mechanisms. This allows the players to use certain so-called "lucky" numbers like birth dates, ages, home address, telephone numbers, and other personally meaningful numbers. In some embodiments, the lottery numbers selected by the player may be stored and used again for that player the next time he is identified at the gaming terminal 10 from his player identification card, which is read by the card reader 24 (FIGS. 1 and 2). The selected lottery numbers may also be stored on the server 41 and used for that player on any gaming terminal connected to the game control network 40.

Figure 5:
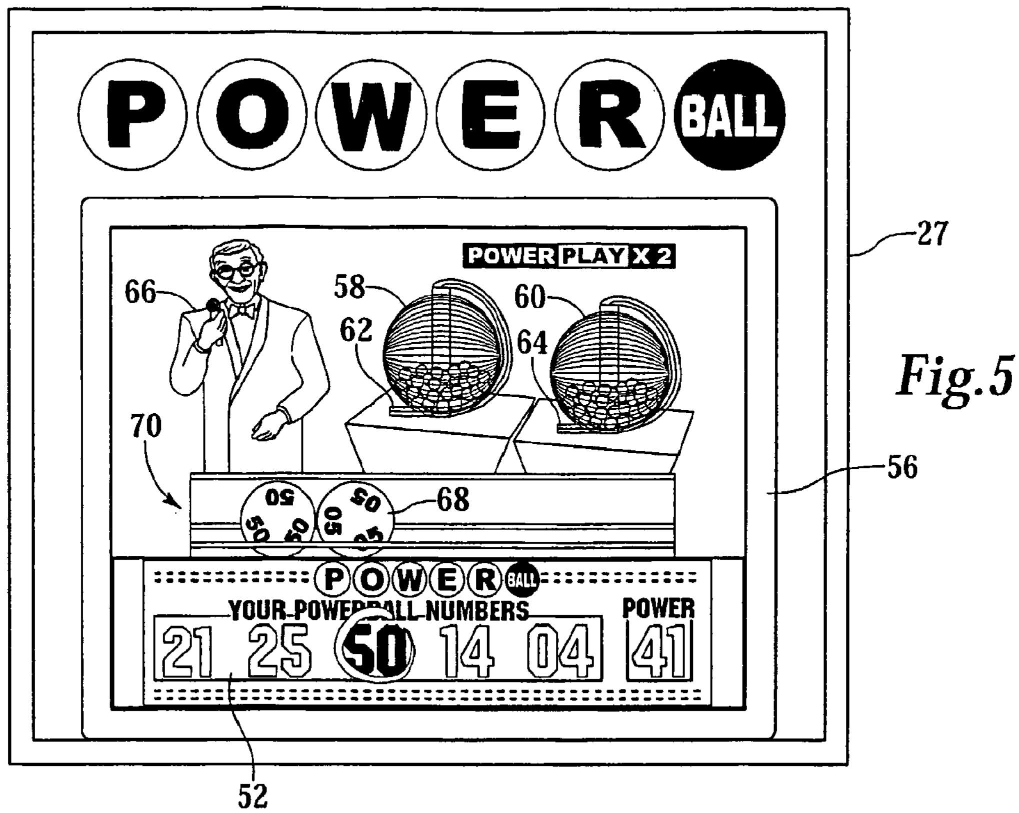
FIG. 5 illustrates a wagering game being conducted on the secondary display.

After displaying the player's lottery ticket 52 and the pay table 54, the gaming terminal 10 initiates a lottery drawing on the secondary display 27, as shown in FIG. 5. The numbers that are to form the outcome of the lottery drawing may be pre-selected at random by the gaming terminal 10, or they may be provided to the gaming terminal 10 by the server 41. In either case, once the lottery numbers are selected, the gaming terminal 10 begins playing a video of the lottery drawing on the secondary display 27. In accordance with embodiments of the invention, the gaming terminal 10 uses a real-life video 56 of a reenactment of a real-life lottery drawing to conduct the lottery drawing. An example of a lottery drawing can be seen every Wednesday and Saturday night at 10:59 p.m. Eastern Time on broadcast television networks that televise the Powerball® lottery drawings. Alternatively, the real-life video 56 can be recorded solely for the purpose of using it within a gaming terminal 10.

The real-life video 56 may show tumblers or drums 58 and 60 having a plurality of number-bearing balls bouncing around therein. One drum 58 contains the number-bearing balls for the lottery numbers while the other drum 60 contains the number-bearing balls for the power ball. After a brief introduction (e.g., a drum roll, musical score, or the like), the real-life video 56 may show the five lottery balls being transferred one-by-one from the drum 58 into a chute 62 thereof. The drawing is concluded when the power ball is transferred to its chute 64. In some embodiments, a real-life host 66 may also be seen and/or heard on the video 56 announcing the numbers for each number-bearing ball. As each number-bearing ball 68 is announced, any matching number on the player's lottery ticket 52 is automatically highlighted (e.g., by circling), thereby adding to the anticipation and excitement level of the gaming experience.

In some embodiments, the secondary display 27 may show a close-up view, indicated generally at 70, of one of the chutes 62 or 64 where the balls 68 can be seen rolling into the chutes with the numbers on the balls clearly discernable. The chute 62 for the lottery balls is shown first, then the chute 64 for the power ball is shown after the five lottery balls have been selected. The close-up view 70 may show real-life balls 68, or it may show computer-generated images of the balls 68. Further, the close-up view 70 may be a part of the real-life video 56, or it may be a separate video clip that is superimposed on top of the real-life video 56. Such a technique is well-known to those having ordinary skill in the art and therefore will not be described here. It will suffice to say that having the close-up view 70 as a separate video clip allows the same real-life video 56 to be played in the background and only the superimposed close-up view 70 needs to be different for each outcome.

To instill confidence in players that the drawing is truly random, the close-up view 70 should ideally be able to show all outcomes of the drawing. Where the close-up view 70 uses animation such as computer-generated balls, showing all outcomes may be accomplished by having the gaming terminal 10 generate the video images of the balls as needed. Where the close-up view 70 uses real-life balls, the task may be more difficult, though still within the ability of persons having ordinary skill in the art. For example, in the current Powerball® format of 50 non-repeating lottery balls and 42 non-repeating power balls, for the close-up view 70 to be able to show every possible outcome, a library of over 120 million different video clips would be needed. The number is many times higher if one considers every possible ordering (i.e., 01-07-30-50-08 versus 01-50-30-07-08) for each outcome.

As an alternative, it is possible instead to store close-up views of only a certain predetermined number of outcomes so long as the number is sufficiently large to give the appearance of randomness. The benefit to players in such an approach, of course, is that the odds of winning are much higher than they would be in a truly random lottery drawing. This approach has the drawback, however, that some lottery tickets will never be fully realized. To compensate, the gaming terminal 10 may be programmed to avoid issuing unrealizable lottery tickets.

Another alternative is to show the real-life balls only while they are rolling into or through a portion of the chutes 62 and 64. Then, computer-generated images may be used for the balls in the close-up view 70 as they are supposed to appear in their respective positions in the chutes 62 and 64. In this way, it would only be necessary to have a real-life video clip of each ball as it is rolling down the chute path (or portion thereof) and into the chutes 62 and 64. Since there are 50 lottery balls and 42 power balls, the total number of real-life video clips that would be needed is 92. And as alluded to above, these 92 video clips may be separate from the real-life video 56, or they may be a part of the real-life video 56 so that there are 92 different versions of the real-life video 56.

The video clips that make up the real-life video 56 and the close-up view 70 may be stored using any suitable compression technology or standard. Examples of compression standards that may be used to store the video clips include any one of the MPEG standards (e.g., MPEG-1, MPEG-2, MPEG-4, MPEG-7, MPEG-21), H.261, H.263, DV, and DivX, all of which are well-known video compression standards and will therefore not be described here. The library of video clips may be stored locally to the gaming terminal 10 via the storage unit 32 (see FIG. 2), or it may be stored remotely via the game control network 40, either on the server 41 or on a separate network storage unit (not expressly shown). If stored via the game control network 40, the real-life video 56 and the close-up view 70 may be streamed as data packets to the gaming terminal 10. Alternatively, where a single real-life video 56 is used, that video clip may be stored locally while the video clips that make up the close-up view 70 may be streamed as needed from the game control network 40 based on the outcome of the lottery drawing.

Figure 6:
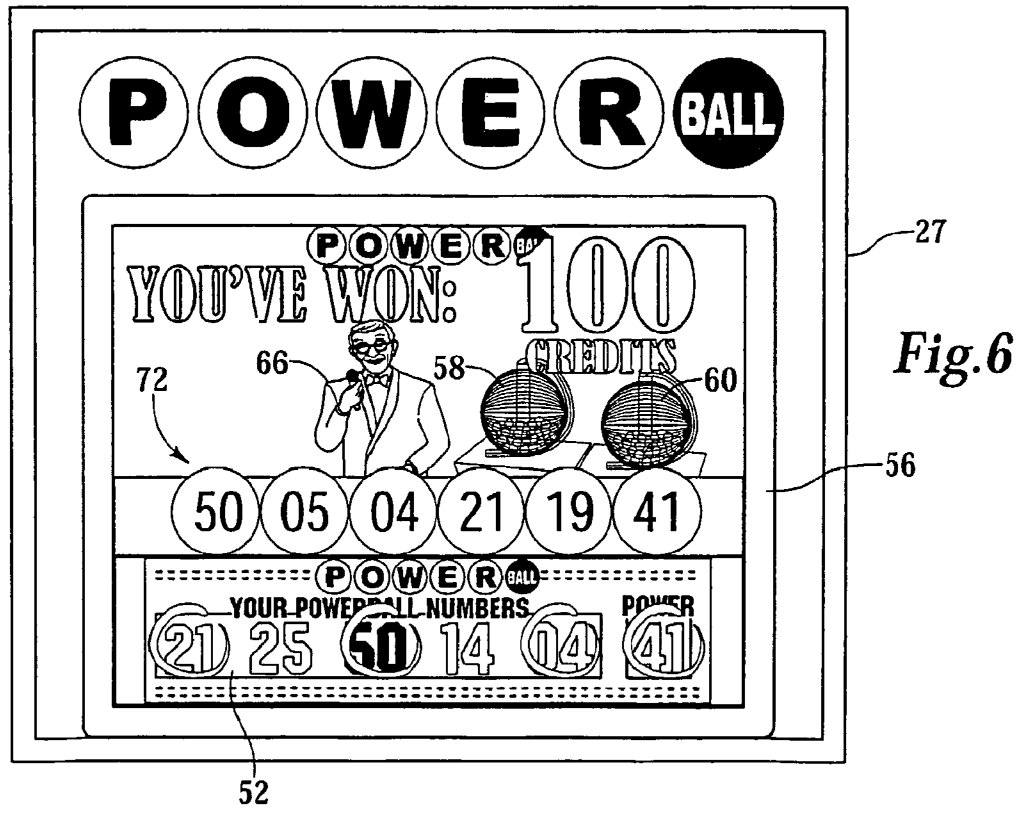
FIG. 6 illustrates the conclusion of the wagering game being conducted on the secondary display.

FIG. 6 shows the secondary display 27 after a complete set of lottery balls, including the power ball, has been drawn. As can be seen, all the numbers for the drawn lottery balls are displayed, indicated generally at 72, along with the player's lottery ticket 52, with numbers that match being highlighted. In this embodiment, the numbers 72 and the lottery ticket 52 may be computer-generated images that are superimposed on the real-life video 56. Further, a visual announcement, such as "YOU'VE WON!" or the like, may also be shown on the secondary display 27 along with the amount of game credits/money won. If the player did not win, a visual announcement such as "SORRY! TRY AGAIN!" or the like may be displayed instead. Either type of visual announcements may be accompanied by a suitable soundtrack and/or voice announcement.

Although embodiments of the invention have been described with respect to a lottery game, the principles and teachings of the invention may be equally applicable to other types of wagering games. In particular, the concept of storing and subsequently reusing player-selected lottery numbers may be applied in many non-lottery wagering games as well. Indeed, certain types of wagering games specifically require the player to manually pick one or more objects from a group or array of objects that, in turn, affect the award or prize won (if any) by the player. Examples of these types of games may be found in commonly assigned U.S. Pat. No. 6,190,255, entitled "Bonus Game for Gaming Machines," which is incorporated herein by reference.

In these games where the player selects one or more objects, the player may have a "lucky" set of picks that he prefers to use each time he plays rather than repeat the selection process. In accordance with embodiments of the invention, the player's preferred picks or selections may be stored in a database, either in the gaming terminal or on a network (e.g., the network server 41 of FIG. 2). The stored selections may then be subsequently retrieved from the gaming terminal or the network and automatically applied in the gaming terminal as needed. Retrieving the stored player-selected picks may be based on the player's player-identification card, as read by a player-identification card reader (see FIG. 1). In addition to a card reader, there are other suitable input devices for identifying a player, such as ones that use a PIN, or a biometric input device. It is also possible to retrieve and automatically apply multiple sets of player-selected picks for one wagering game or for several wagering games.

Figure 7:
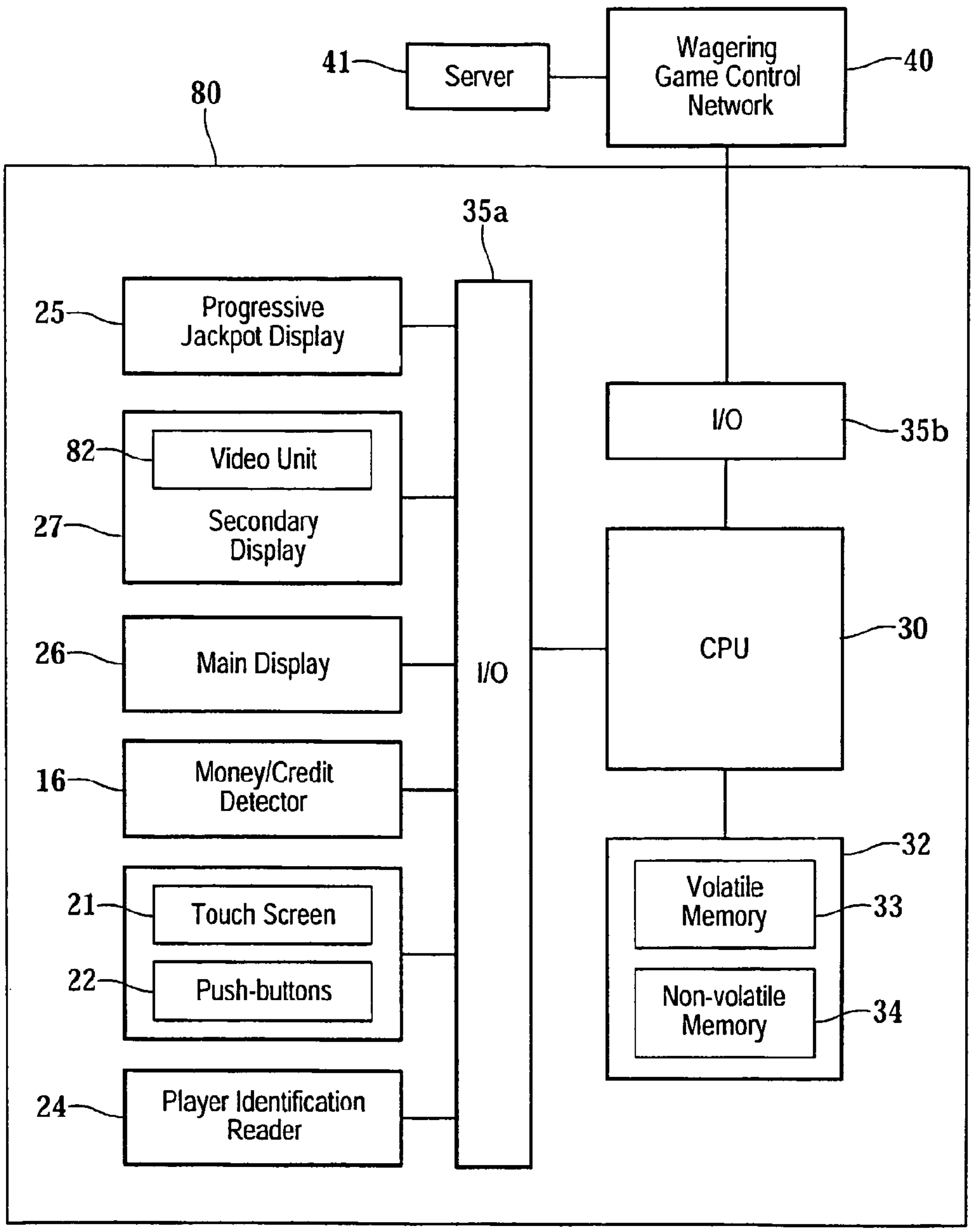
FIG. 7 illustrates a block diagram of a gaming terminal according to another embodiment of the invention.

In some embodiments, the real-life video 56 and the close-up view 70 described above may be implemented on a separate video unit connected to the CPU 30 and the secondary display 27 (see FIG. 2) such that the secondary display 27 may playback images and/or video clips provided by either the CPU 30 or the video unit, or both, as instructed by the CPU 30. FIG. 7 illustrates an exemplary gaming terminal 80 according to such an embodiment. As can be seen, the gaming terminal 80 is similar to the gaming terminal 10 of FIG. 2 in that it includes many of the same components and is also connectable to the wagering game control network 40. Unlike the earlier gaming terminal 10, however, the present gaming terminal 80 includes a separate, stand-alone video unit 82 that may be either mounted in or otherwise connected to the secondary display 27.

In operation, the video unit 82 is controllable by the CPU 30 to provide full-screen, full-motion playback of the real-life video 56 and the close-up view 70 on the secondary display 27. Because the video unit 82 is a separate, stand-alone unit, it is capable of processing and providing the full-screen, full-motion playback with little or no assistance from the CPU 30 or the other components in the gaming terminal 80. For example, the video unit 82 does not require the CPU 30 or the other components in the gaming terminal 80 to compress/uncompress the real-life video 56 or the close-up view 70, or to process or otherwise render the real-life video 56 or the close-up view 70. Any such compression/decompression (if needed) or rendering may be handled entirely or almost entirely by the video unit 82. The video unit 82, however, does need the CPU 30 to identify which video clips need to be played and when to play them.

In some embodiments, the video unit 82 may be implemented using a DVD player that is mounted in or otherwise connected to the gaming terminal 80. In that case, the video clips of the real-life video 56 and the close-up view 70 may be stored on a DVD. Different types of bonus games may then be played by simply swapping out the DVD. For more information regarding the use of a DVD player in a gaming terminal, see commonly owned U.S. patent application entitled by "Method and Apparatus for Presenting Media in a Gaming Device," by Alfred Thomas and James Poole, bearing Ser. No. 11/568,664, which is incorporated herein by reference in its entirety.

In other embodiments, the video unit 82 may be implemented using a digital video recorder that is mounted in or otherwise connected to the gaming terminal 80. In that case, the video clips of real-life video 56 and the close-up view 70 may be stored on a magnetic storage unit such as the hard drive of the digital video recorder. Examples of such digital video recorders include the "Series2" digital video recorder available from TiVO, Inc. of Alviso, Calif. Other types of stand-alone video units may certainly be used without departing from the scope of the invention.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A gaming terminal for playing a basic wagering game and a bonus game, comprising:

at least one display for displaying a randomly selected outcome for said basic wagering game, said randomly selected outcome being selected from a plurality of outcomes in response to receiving a wager input from a player, said plurality of outcomes including a start-bonus outcome; and wherein, in response to said start-bonus outcome being said randomly selected outcome, said at least one display displaying a lottery ticket with lottery numbers thereon and a real-life video of a lottery drawing in which number-bearing lottery balls are randomly selected, said player achieving a bonus award in response to a match between at least some of said lottery numbers and said selected number-bearing lottery balls.

2. The gaming terminal according to claim 1, further comprising a network interface for connecting said gaming terminal to a network of gaming terminals.

3. The gaming terminal according to claim 2, wherein said controller resides in said gaming terminal.

4. The gaming terminal according to claim 2, wherein said controller resides on a network server to which several gaming terminals are connected.

5. The gaming terminal according to claim 2, wherein said controller randomly selects said lottery numbers on said lottery ticket.

6. The gaming terminal according to claim 1, further comprising a controller for randomly selecting said number-bearing lottery balls.

7. The gaming terminal according to claim 1, further comprising a player input mechanism for allowing said player to select said lottery numbers.

8. The gaming terminal according to claim 1, further comprising a storage unit located in said gaming terminal for storing said real-life video.

9. The gaming terminal according to claim 1, further comprising a storage unit located on a network to which several gaming terminals are connected, said storage unit storing said real-life video.

10. The gaming terminal according to claim 1, further comprising a player identification system for identifying said player, said player identification system causing said at least one display to display a customized greeting to said player.

11. The gaming terminal according to claim 10, wherein said player identification system further causes said at least one display to display a lottery ticket having lottery numbers that are preselected by said player and stored within said player identification system.

12. The gaming terminal according to claim 1, further comprising a video unit connected to said gaming terminal for processing said real-life video and providing full-screen, full-motion playback of said real-life video to said at least one display.

13. The gaming terminal according to claim 12, wherein said video unit is a separate unit that is capable of providing said full-screen, full-motion playback on a stand-alone basis.

14. A method of conducting a wagering game via a gaming system, said gaming system including a display, a processor, and a storage unit, said method comprising:

allocating, via the processor, lottery numbers to a player of said wagering game;

storing, via said storage unit, a plurality of real-life video clips showing different outcomes of a lottery drawing with number-bearing lottery balls;

randomly selecting an outcome for said wagering game; and playing back, via said display, one or more video clips of said plurality of real-life video clips corresponding to said randomly selected outcome.

15. The method according to claim 14, wherein said wagering game is a basic wagering game.

16. The method according to claim 14, wherein said wagering game is a bonus game that is initiated upon occurrence of a predetermined outcome for a basic wagering game.

17. The method according to claim 14, wherein said step of allocating includes randomly selecting, via said processor, said lottery numbers.

18. The method according to claim 14, wherein said step of allocating includes allowing the player to manually select said lottery numbers displayed on said display.

19. The method according to claim 14, wherein said plurality of real-life video clips includes a real-life close-up view of every possible combination of number-bearing lottery balls.

20. The method according to claim 14, wherein said plurality of real-life video clips includes a real-life close-up view of certain ones every possible combination of number-bearing lottery balls.

21. The method according to claim 14, wherein said step of randomly selecting an outcome includes said number-bearing lottery balls rolling from a drum of lottery balls down a chute path and into a chute, said plurality of real-life video clips including a close-up view of each number-bearing ball rolling down a portion of said chute path.

22. The method according to claim 14, wherein said plurality of real-life video clips is augmented with an animated close-up view of every possible combination of number-bearing lottery balls.

23. The method according to claim 14, wherein said plurality of real-life video clips are full-screen, full-motion video clips.

24. A method of conducting a wagering game on a gaming terminal, the method comprising:

receiving, via at least one input device, a set of player-preferred selections from an array of player selectable options, said set comprising a preferred outcome;

storing, in a database, said set of player-preferred selections;

randomly generating, via one or more processors, an outcome of said wagering game;

retrieving said set of player-preferred selections from said database;

displaying, via at least one display device, real-life video of a lottery drawing in which number-bearing balls are selected, said selected number-bearing balls comprising said randomly generated outcome;

applying said set of player-preferred selections to said randomly generated outcome; and determining an outcome of said wagering game, via the one or more processors, based on a match between at least some of said player-preferred selections and said selected number-bearing balls.

25. The method according to claim 24, wherein said wagering game is a bonus game triggered by a start-bonus outcome occurring in a basic game.

26. The method according to claim 24, further comprising displaying said array of player-selectable options prior to said retrieving step.

27. The method according to claim 24, wherein said real-life video is stored on a network to which said gaming terminal is connected.

28. The method according to claim 24, wherein said database is stored on a network to which said gaming terminal is connected.

29. The method according to claim 28, further comprising retrieving said set of player-preferred selections based on a player's identity.

* * * * *